United States Patent
Nagurny et al.

(10) Patent No.: US 9,513,060 B2
(45) Date of Patent: Dec. 6, 2016

(54) HELICAL TUBE BUNDLE ARRANGEMENTS FOR HEAT EXCHANGERS

(75) Inventors: Nicholas J. Nagurny, Manassas, VA (US); Natalie Levings, Palm Beach Gardens, FL (US); Derek Beckner, Herndon, VA (US); Scott M. Maurer, Haymarket, VA (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 12/836,688

(22) Filed: Jul. 15, 2010

(65) Prior Publication Data

US 2011/0011572 A1 Jan. 20, 2011

Related U.S. Application Data

(60) Provisional application No. 61/225,991, filed on Jul. 16, 2009.

(51) Int. Cl.
| | |
|---|---|
| F28D 7/02 | (2006.01) |
| F28D 7/00 | (2006.01) |
| F28D 7/10 | (2006.01) |
| F28F 9/18 | (2006.01) |
| F28F 21/08 | (2006.01) |
| F28F 9/013 | (2006.01) |
| F28F 19/00 | (2006.01) |
| F28F 9/22 | (2006.01) |

(52) U.S. Cl.
CPC ............. *F28D 7/024* (2013.01); *F28F 9/18* (2013.01); *F28F 21/084* (2013.01); *F28F 9/013* (2013.01); *F28F 19/00* (2013.01); *F28F 2009/226* (2013.01); *F28F 2275/062* (2013.01); *Y02E 10/34* (2013.01)

(58) Field of Classification Search
CPC ............. F28D 7/024; F28F 21/084; F28F 9/18; F28F 2009/226
USPC .............. 165/154, 156, 140, 162, 163, 172
See application file for complete search history.

(56) References Cited

U.S. PATENT DOCUMENTS

| | | | |
|---|---|---|---|
| 1,622,664 A | 3/1927 | Murray et al. | |
| 2,040,947 A | 5/1936 | Mojonnier et al. | |

(Continued)

FOREIGN PATENT DOCUMENTS

| | | |
|---|---|---|
| CN | 1333868 A | 1/2002 |
| CN | 2821508 Y | 9/2006 |

(Continued)

OTHER PUBLICATIONS

Vassoille, Bruno, "PCT Application No. PCT/2010/042079 International Search Report Mar. 23, 2011",, Publisher: PCT, Published in: PCT.

(Continued)

*Primary Examiner* — Len Tran
*Assistant Examiner* — Claire Rojohn, III
(74) *Attorney, Agent, or Firm* — Withrow & Terranova, PLLC

(57) ABSTRACT

A heat exchanger comprising helically wound tube bundles is disclosed. The helically wound tube bundles are joined with tube sheets to define a primary working fluid system that is fluidically isolated from a secondary working fluid system. The tube sheets and tubes are formed of the same material, which facilitates their joining by means of joints that are substantially galvanic corrosion-resistant joints.

7 Claims, 6 Drawing Sheets

(56) References Cited

U.S. PATENT DOCUMENTS

| | | | |
|---|---|---|---|
| 2,071,277 A * | 2/1937 | Barclay | F28D 7/163 |
| | | | 165/111 |
| 2,083,028 A | 6/1937 | Livar | |
| 2,229,554 A * | 1/1941 | Cummings | C10G 11/02 |
| | | | 122/32 |
| 2,347,957 A | 5/1944 | McCullough | |
| 2,424,265 A | 7/1947 | Allen | |
| 2,540,339 A | 2/1951 | Kritzer | |
| 2,653,211 A | 9/1953 | Andrus | |
| 2,938,712 A | 5/1960 | Pellmyr | |
| 2,995,343 A * | 8/1961 | Gardner | F22B 1/063 |
| | | | 122/483 |
| 3,294,162 A | 12/1966 | Loehlein et al. | |
| 3,460,611 A | 8/1969 | Folsom et al. | |
| 3,476,179 A | 11/1969 | Meister et al. | |
| 3,595,310 A | 7/1971 | Burne et al. | |
| 3,805,515 A | 4/1974 | Zener | |
| 3,807,494 A | 4/1974 | Ris | |
| 3,825,061 A | 7/1974 | Bathla | |
| 4,055,145 A | 10/1977 | Mager et al. | |
| 4,095,646 A | 6/1978 | Granetzke | |
| 4,098,329 A * | 7/1978 | Culver | F28D 7/1669 |
| | | | 122/32 |
| 4,099,928 A | 7/1978 | Norback | |
| 4,103,647 A * | 8/1978 | Dorling | F22B 37/266 |
| | | | 122/34 |
| 4,149,591 A | 4/1979 | Albertsen | |
| 4,150,719 A | 4/1979 | Thielen et al. | |
| 4,253,516 A | 3/1981 | Giardina | |
| 4,276,927 A | 7/1981 | Foust | |
| 4,294,564 A | 10/1981 | Person et al. | |
| 4,323,114 A * | 4/1982 | Corey | B01D 1/10 |
| | | | 122/32 |
| 4,350,014 A | 9/1982 | Sanchez et al. | |
| 4,355,684 A | 10/1982 | Caines | |
| 4,401,155 A | 8/1983 | Royal et al. | |
| 4,432,307 A | 2/1984 | Godin | |
| 4,478,277 A | 10/1984 | Friedman et al. | |
| 4,592,416 A | 6/1986 | Mattison et al. | |
| 4,625,794 A | 12/1986 | Dürst | |
| 4,633,819 A * | 1/1987 | Tilliette | 122/32 |
| 4,688,631 A | 8/1987 | Peze et al. | |
| 4,693,304 A | 9/1987 | Volland | |
| 4,729,427 A | 3/1988 | Baumann | |
| 4,738,309 A | 4/1988 | Schilling | |
| 4,753,773 A * | 6/1988 | Garabedian et al. | 376/299 |
| 4,941,530 A | 7/1990 | Crowe | |
| 5,042,572 A | 8/1991 | Dierbeck | |
| 5,137,080 A | 8/1992 | Haasch et al. | |
| 5,178,822 A * | 1/1993 | Buford, III | C23G 1/00 |
| | | | 122/379 |
| 5,285,843 A | 2/1994 | Dierbeck | |
| 5,289,870 A | 3/1994 | Dierbeck | |
| 5,303,770 A | 4/1994 | Dierbeck | |
| 5,448,830 A | 9/1995 | Borchert et al. | |
| 5,452,758 A | 9/1995 | Mauterer | |
| 5,499,674 A | 3/1996 | Bartz et al. | |
| 5,513,700 A | 5/1996 | Kleve et al. | |
| 5,566,881 A | 10/1996 | Inoue et al. | |
| 5,590,707 A | 1/1997 | Mauterer | |
| 5,655,600 A | 8/1997 | Dewar et al. | |
| 5,775,412 A | 7/1998 | Montestruc, III et al. | |
| 5,813,592 A | 9/1998 | Midling et al. | |
| 5,988,266 A | 11/1999 | Smith et al. | |
| 6,009,938 A | 1/2000 | Smith et al. | |
| 6,035,928 A | 3/2000 | Ruppel et al. | |
| 6,059,026 A | 5/2000 | Bailly et al. | |
| 6,106,789 A * | 8/2000 | Thompson | B01J 19/24 |
| | | | 165/145 |
| 6,173,493 B1 | 1/2001 | Dierbeck | |
| 6,390,185 B1 * | 5/2002 | Proeschel | 165/155 |
| 6,637,109 B2 | 10/2003 | Nyqvist | |
| 6,808,689 B1 * | 10/2004 | Matsumoto et al. | 422/658 |
| 6,901,660 B2 * | 6/2005 | Miska | 29/846 |
| 6,945,322 B2 | 9/2005 | Ikeda | |
| 7,055,576 B2 | 6/2006 | Fernstrum | |
| 7,165,605 B2 * | 1/2007 | Park et al. | 165/156 |
| 7,328,578 B1 | 2/2008 | Saucedo | |
| 7,549,466 B2 | 6/2009 | Hayashi et al. | |
| 7,726,388 B2 | 6/2010 | Toda | |
| 7,921,558 B2 | 4/2011 | Beamer et al. | |
| 7,926,558 B2 | 4/2011 | Hagberg | |
| 7,967,060 B2 | 6/2011 | Trumbower et al. | |
| 8,540,012 B2 | 9/2013 | Nagurny et al. | |
| 2002/0038702 A1 * | 4/2002 | Font-Freide | B01J 19/0013 |
| | | | 165/159 |
| 2002/0153130 A1 * | 10/2002 | Okamoto et al. | 165/170 |
| 2005/0061485 A1 | 3/2005 | Hirafuji et al. | |
| 2005/0103482 A1 | 5/2005 | Park et al. | |
| 2005/0133567 A1 | 6/2005 | Runyan | |
| 2005/0173103 A1 | 8/2005 | Dawson | |
| 2006/0175051 A1 | 8/2006 | Kinoshita | |
| 2007/0029070 A1 | 2/2007 | Yamamoto et al. | |
| 2007/0131399 A1 | 6/2007 | Digele | |
| 2007/0138237 A1 * | 6/2007 | Nishikawa et al. | 228/112.1 |
| 2007/0284095 A1 | 12/2007 | Wang et al. | |
| 2008/0029254 A1 | 2/2008 | Sekito et al. | |
| 2008/0078536 A1 | 4/2008 | Tolani | |
| 2008/0135219 A1 | 6/2008 | Doh et al. | |
| 2008/0241615 A1 | 10/2008 | Sugimasa et al. | |
| 2009/0008066 A1 | 1/2009 | Meng et al. | |
| 2009/0065178 A1 | 3/2009 | Kasezawa et al. | |
| 2009/0159643 A1 * | 6/2009 | Wimmer et al. | 228/112.1 |
| 2009/0229804 A1 | 9/2009 | Zebuhr | |
| 2009/0294110 A1 | 12/2009 | Foust | |
| 2009/0308582 A1 | 12/2009 | Nagurny et al. | |
| 2011/0011570 A1 | 1/2011 | Levings et al. | |
| 2011/0079375 A1 | 4/2011 | Nagurny et al. | |
| 2011/0120126 A1 | 5/2011 | Srinivasan | |
| 2011/0127022 A1 | 6/2011 | Eller et al. | |
| 2011/0173978 A1 | 7/2011 | Rekret et al. | |
| 2012/0011849 A1 | 1/2012 | Cole et al. | |
| 2012/0073291 A1 | 3/2012 | Shapiro et al. | |
| 2012/0080175 A1 | 4/2012 | Levings et al. | |
| 2012/0125561 A1 | 5/2012 | Levings et al. | |
| 2012/0199331 A1 * | 8/2012 | Maurer | F28D 7/024 |
| | | | 165/172 |
| 2013/0042612 A1 | 2/2013 | Shapiro et al. | |
| 2013/0042613 A1 | 2/2013 | Ross et al. | |
| 2013/0042996 A1 | 2/2013 | Hwang et al. | |

FOREIGN PATENT DOCUMENTS

| | | |
|---|---|---|
| CN | 203443419 U | 2/2014 |
| DE | 2351529 A1 | 4/1975 |
| DE | 19624937 A1 | 1/1998 |
| DE | 102005058314 A1 * | 6/2007 |
| DE | 102007021420 A1 | 11/2008 |
| EP | 0174554 A1 | 3/1986 |
| EP | 1033546 A2 | 9/2000 |
| EP | 2072938 A2 | 6/2009 |
| FR | 1374955 A | 10/1964 |
| FR | 1559076 A | 3/1969 |
| FR | 2510729 A1 | 2/1983 |
| GB | 969319 A | 9/1964 |
| GB | 2424265 A | 9/2006 |
| JP | S5420690 B2 | 7/1979 |
| JP | 57018473 A | 1/1982 |
| JP | S6131889 A | 2/1986 |
| JP | S61213493 A | 9/1986 |
| JP | S6288169 U | 6/1987 |
| JP | 62158996 A | 7/1987 |
| JP | S62158996 A | 7/1987 |
| JP | S62136770 U | 8/1987 |
| JP | S62233684 A | 10/1987 |
| JP | S6317961 U | 2/1988 |
| JP | S63169494 A | 7/1988 |
| JP | 6344708 Y2 | 11/1988 |
| JP | 02077469 A | 3/1990 |
| JP | 02084252 A | 3/1990 |
| JP | H04214191 A | 8/1992 |
| JP | H05308829 A | 11/1993 |
| JP | H05340342 A | 12/1993 |

(56) References Cited

FOREIGN PATENT DOCUMENTS

| | | |
|---|---|---|
| JP | H0622017 U | 3/1994 |
| JP | H0645159 Y2 | 11/1994 |
| JP | 10005681 A | 1/1998 |
| JP | H10339588 A | 12/1998 |
| JP | H1147960 A | 2/1999 |
| JP | H11503816 A | 3/1999 |
| JP | 11264691 A | 9/1999 |
| JP | 2000073164 A | 3/2000 |
| JP | 2001133195 A | 5/2001 |
| JP | 2002066720 A | 3/2002 |
| JP | 2003037386 A | 2/2003 |
| JP | 2004167334 A | 6/2004 |
| JP | 3102194 U | 7/2004 |
| JP | 2005194624 A | 7/2005 |
| JP | 2006026721 A | 2/2006 |
| JP | 2006205252 A | 8/2006 |
| JP | 2006207950 A | 8/2006 |
| JP | 2006289481 A | 10/2006 |
| JP | 2006297437 A | 11/2006 |
| JP | 2006337000 A | 12/2006 |
| JP | 2007511735 A | 5/2007 |
| JP | 2007163073 A | 6/2007 |
| JP | 2007203347 A | 8/2007 |
| JP | 2008503047 A | 1/2008 |
| JP | 2008070026 A | 3/2008 |
| JP | 2008239451 A | 10/2008 |
| JP | 2009517625 A | 4/2009 |
| JP | 3178668 U | 9/2012 |
| KR | 1020080076222 A | 8/2008 |
| WO | 9749962 A1 | 12/1997 |
| WO | 0181849 A1 | 1/2001 |
| WO | 2006115073 A1 | 11/2006 |
| WO | 2009056446 A1 | 5/2009 |

OTHER PUBLICATIONS

Vassoille, Bruno, "PCT Application No. PCT/US2010/042079 International Preliminary Report on Patentability Jan. 24, 2012", , Publisher: PCT, Published in: PCT.
"Related Chinese Patent Application No. 2010800318211 Office Action", Mar. 5, 2013, Publisher: SIPO, Published in: CN.
Asoka Dias-Abey, "Australian Patent Application No. 2010273345 Examination Report No. 1", Nov. 1, 2012, Publisher: IP Australia, Published in: AU.
Examiner: Nishiyama, "Related JP Patent Application No. JP 2012-520769", "Office Action", Mar. 5, 2014, Publisher: JPO, Published in: JP.
"Related Canadian Patent Application No. 2,767,174", "Office Action", Mar. 6, 2014, Publisher: Canadian Intellectual Property Office, Published in: CA.
"Related Chinese Patent Application No. 201080031821.1", "Office Action", Nov. 15, 2013, Publisher: CIPO, Published in: CN.
"Related Canadian Patent Application No. 2,767,174 Office Action", Jun. 3, 2013, Publisher: CIPO (Canadian Intellectual Property Office), Published in: CA.
U.S. Appl. No. 12/690,373, filed Jan. 20, 2010.
U.S. Appl. No. 12/573,982, filed Oct. 6, 2009.
U.S. Appl. No. 12/628,594, filed Dec. 1, 2009.
U.S. Appl. No. 12/838,114, filed Jul. 16, 2010.
U.S. Appl. No. 13/032,119, filed Feb. 22, 2011.
U.S. Appl. No. 13/301,252, filed Nov. 21, 2011.
Non-Final Office Action for U.S. Appl. No. 12/484,542, mailed Nov. 19, 2012, 15 pages.
Non-Final Office Action for U.S. Appl. No. 12/628,594, mailed Sep. 24, 2012, 9 pages.
Restriction Requirement for U.S. Appl. No. 12/690,373, mailed Apr. 18, 2013, 8 pages.
Final Office Action for U.S. Appl. No. 12/690,373, mailed Jan. 30, 2014, 12 pages.
Final Office Action for U.S. Appl. No. 12/690,373, mailed Apr. 30, 2015, 11 pages.
Non-Final Office Action for U.S. Appl. No. 13/301,252, mailed Apr. 29, 2015, 11 pages.
Advisory Action for U.S. Appl. No. 13/032,119, mailed Jun. 30, 2015, 3 pages.
Notice of Allowance for U.S. Appl. No. 12/484,542, mailed Mar. 22, 2013, 8 pages.
First Office Action for Korean Patent Application No. 10-2015-7007662, mailed May 12, 2015, 8 pages.
Examination Report for European Patent Application No. 10 740 788.4, mailed May 20, 2015, 4 pages.
Final Office Action for U.S. Appl. No. 12/573,982, mailed Aug. 24, 2015, 11 pages.
Non-Final Office Action for U.S. Appl. No. 13/032,119, mailed Oct. 23, 2015, 15 pages.
Notice of Allowance for U.S. Appl. No. 13/301,252, mailed Sep. 30, 2015, 10 pages.
Third Office Action for Chinese Patent Application No. 201080032268.3, issued Nov. 23, 2015, 4 pages.
Notice of Reasons for Rejection for Japanese Patent Application No. 2015-037591, mailed Dec. 11, 2015, 17 pages.
Reasons for Decision of Rejection for Korean Divisional Patent Application No. 10-2015-7007662, mailed Dec. 24, 2015, 5 pages.
Reasons for Decision of Rejection for Korean Divisional Patent Application No. 10-2015-7007662, mailed Apr. 28, 2016, 5 pages.
Decision on Appeal for U.S. Appl. No. 12/628,594, mailed Apr. 19, 2016, 6 pages.
Final Office Action for U.S. Appl. No. 13/032,119, mailed Mar. 1, 2016, 20 pages.
Advisory Action for U.S. Appl. No. 13/032,119, mailed May 10, 2016, 3 pages.
Non-Final Office Action for U.S. Appl. No. 12/573,982, mailed Dec. 18, 2015, 10 pages.
Notification of Reason for Refusal for Japanese Patent Application No. 2012-533215, issued Jun. 27, 2014, 12 pages.
Non-Final Office Action for U.S. Appl. No. 13/301,252, mailed Jul. 11, 2014, 9 pages.
Stone, K.M., "Review of Literature on Heat Transfer Enhancement in Compact Heat Exchangers," ACRC TR-105, Air Conditioning and Refrigeration Center, University of Illinois, Aug. 1996, 39 pages.
Patent Examination Report No. 1 for Australian Patent Application No. 2010273997, issued Nov. 16, 2012, 3 pages.
Patent Examination Report No. 2 for Australian Patent Application No. 2010273997, issued Jul. 17, 2013, 3 pages.
Patent Examination Report No. 3 for Australian Patent Application No. 2010273997, issued Oct. 4, 2013, 3 pages.
Yang, T. L. et al., "Forced Heat Convection of Wavy Fin Channel," Journal of Thermal Science and Technology, vol. 3, No. 2, 2008, pp. 342-354.
Office Action for Canadian Patent Application No. 2,766,917, issued Mar. 21, 2013, 4 pages.
Office Action for Canadian Patent Application No. 2,766,917, issued Apr. 23, 2014, 2 pages.
Office Action for Canadian Patent Application No. 2,767,174, issued Jun. 3, 2013, 3 pages.
Office Action for Canadian Patent Application No. 2,767,174, issued Mar. 6, 2014, 2 pages.
Patent Examination Report No. 1 for Australian Patent Application No. 2010-303747, issued Mar. 12, 2013, 3 pages.
First Office Action for Chinese Patent Application No. 201080032268.3, issued Dec. 24, 2013, 8 pages.
Second Office Action for Chinese Patent Application No. 201080032268.3, issued Oct. 24, 2014, 17 pages.
Notification of Reason for Refusal for Japanese Patent Application No. 2012-520769, mailed Mar. 5, 2014, 10 pages.
Office Action for Japanese Patent Application No. 2012-520821, mailed May 14, 2014, 6 pages.
Final Rejection for Japanese Patent Application No. 2012-520821, mailed Feb. 9, 2015, 4 pages.
Office Action for Korean Patent Application No. 10-2012-7003687, issued May 31, 2013, 7 pages.
Office Action for Korean Patent Application No. 10-2012-7003687, issued Feb. 27, 2014, 7 pages.

(56) References Cited

OTHER PUBLICATIONS

Decision of Refusal for Korean Patent Application No. 10-2012-7003687, issued Dec. 26, 2014, 5 pages.
Office Action for Canadian Patent Application No. 2,774,682, mailed Sep. 9, 2013, 2 pages.
Office Action for Chinese Patent Application No. 201080045277.6, issued Sep. 26, 2013, 5 pages.
International Search Report for PCT/US2010/042333, mailed Jan. 25, 2012, 8 pages.
International Preliminary Report on Patentability for PCT/US2010/042333, mailed Feb. 9, 2012, 7 pages.
Non-Final Office Action for U.S. Appl. No. 12/690,373, mailed Aug. 7, 2013, 11 pages.
Non-Final Office Action for U.S. Appl. No. 12/690,373, mailed Sep. 12, 2014, 12 pages.
Final Office Action for U.S. Appl. No. 13/032,119, mailed Mar. 26, 2015, 16 pages.
Non-Final Office Action for U.S. Appl. No. 13/032,119, mailed Aug. 16, 2013, 15 pages.
Non-Final Office Action for U.S. Appl. No. 13/032,119, mailed Nov. 21, 2013, 19 pages.
Final Office Action for U.S. Appl. No. 13/032,119, mailed Jan. 3, 2014, 14 pages.
Final Office Action for U.S. Appl. No. 13/301,252, mailed Sep. 8, 2014, 9 pages.
Final Office Action for U.S. Appl. No. 12/628,594, mailed Mar. 1, 2013, 9 pages.
Examiner's Answer for U.S. Appl. No. 12/628,594, mailed Oct. 24, 2013, 12 pages.
Non-Final Office Action for U.S. Appl. No. 12/838,114, mailed Apr. 10, 2013, 13 pages.
Final Office Action for U.S. Appl. No. 12/838,114, mailed Aug. 8, 2013, 15 pages.
Non-Final Office Action for U.S. Appl. No. 13/032,119, mailed Dec. 4, 2014, 17 pages.
Restriction Requirement for U.S. Appl. No. 12/573,982, mailed Jun. 6, 2012, 6 pages.
Non-Final Office Action for U.S. Appl. No. 12/573,982, mailed Sep. 4, 2012, 13 pages.
Final Office Action for U.S. Appl. No. 12/573,982, mailed Mar. 1, 2013, 16 pages.
Advisory Action for U.S. Appl. No. 12/573,982, mailed May 15, 2013, 3 pages.
Non-Final Office Action for U.S. Appl. No. 12/573,982, mailed Jul. 18, 2013, 15 pages.
Final Office Action for U.S. Appl. No. 12/573,982, mailed Dec. 5, 2013, 15 pages.
Examiner's Answer for U.S. Appl. No. 12/573,982, mailed Aug. 20, 2014, 19 pages.
Non-Final Office Action for U.S. Appl. No. 12/573,982, mailed Jan. 9, 2015, 13 pages.
Notification of Reason for Refusal for Japanese Patent Application No. 2012-533215, issued Sep. 26, 2013, 5 pages.
Office Action for Korean Patent Application No. 10-2012-7011568, issued Oct. 21, 2013, 8 pages.
International Search Report and Written Opinion for PCT/US2010/050711, mailed Jul. 1, 2011, 15 pages.
Written Opinion for PCT/US2010/050711, mailed Nov. 18, 2011, 6 pages.
International Preliminary Report on Patentability for PCT/US2010/050711, mailed Jan. 27, 2012, 17 pages.
Non-Final Office Action for U.S. Appl. No. 12/484,542, mailed Apr. 5, 2012, 6 pages.
Decision of Rejection for Japanese Patent Application No. 2015-037591, mailed Aug. 23, 2016, 13 pages.
First Office Action for Korean Patent Application No. 10-2012-7003688, mailed Aug. 31, 2016, 12 pages.

\* cited by examiner

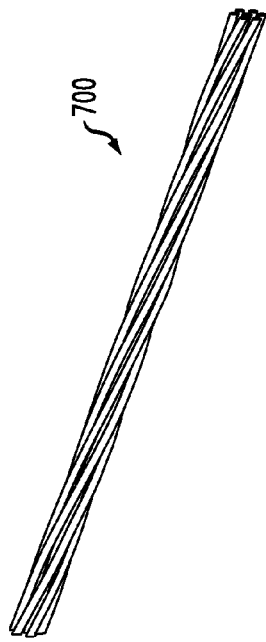
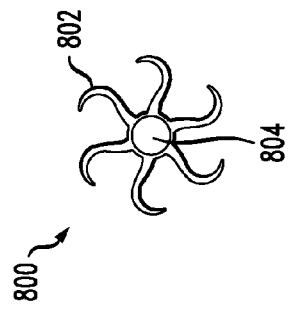
FIG. 7A
FIG. 8
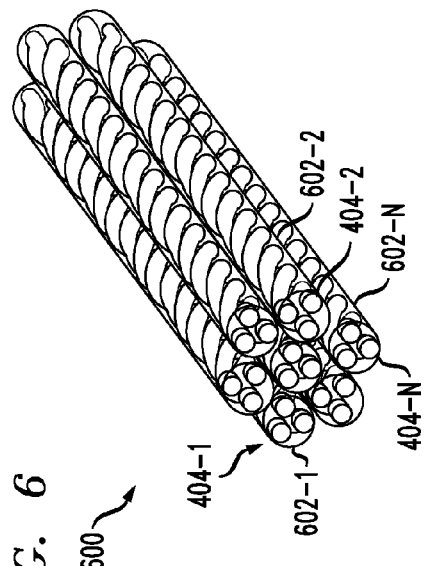
FIG. 6
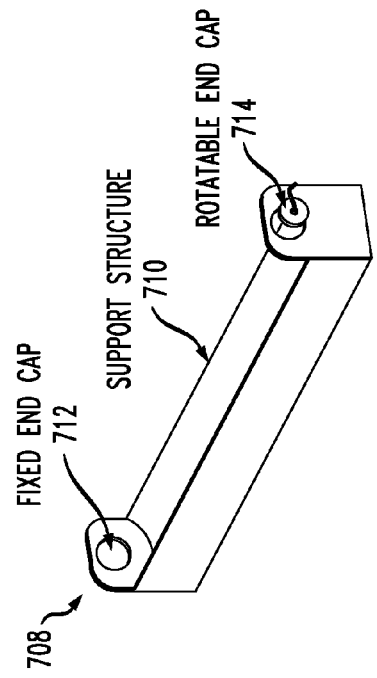
FIG. 7C
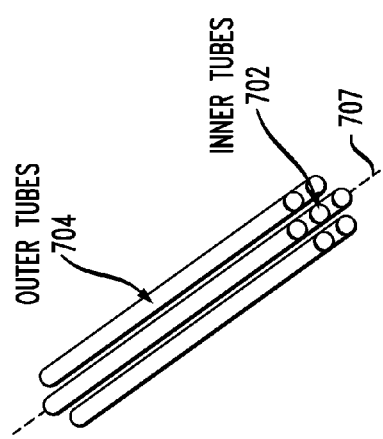
FIG. 7B

HELICAL TUBE BUNDLE ARRANGEMENTS FOR HEAT EXCHANGERS

CROSS REFERENCE TO RELATED APPLICATIONS

This case claims priority of U.S. Provisional Patent Application Ser. No. 61/225,991, which was filed Jul. 16, 2009, and which is incorporated herein by reference.

If there are any contradictions or inconsistencies in language between this application and one or more of the cases that have been incorporated by reference that might affect the interpretation of the claims in this case, the claims in this case should be interpreted to be consistent with the language in this case.

FIELD OF THE INVENTION

The present invention relates to heat exchangers in general, and, more particularly, to shell-and-tube heat exchangers.

BACKGROUND OF THE INVENTION

Ocean thermal energy conversion ("OTEC") is a method for generating electricity based on the temperature difference that exists between deep and shallow waters of a large body of water, such as an ocean, sea, gulf, or large, deep lake. An OTEC system utilizes a heat engine (i.e., a thermodynamic device or system that generates electricity based on a temperature differential) that is thermally coupled between relatively warmer shallow and relatively colder deep water.

One heat engine suitable for OTEC is based on the Rankine cycle, which uses a low-pressure turbine. A closed-loop conduit containing a fluid characterized by a low boiling point, such as ammonia, is thermally coupled with warm water at a first heat exchanger where the low-boiling-point fluid is vaporized. The expanding vapor is forced through the turbine, which drives a turbo-generator. After exiting the turbine, the vaporized working fluid is condensed back into a liquid state at a second heat exchanger where the closed-loop conduit is thermally coupled with cold water. The condensed working fluid is then recycled through the system.

OTEC systems have been shown to be technically viable, but the high capital cost of these systems has thwarted commercialization. The heat exchangers are the second largest contributor to OTEC plant capital cost (the largest is the cost of the offshore moored vessel or platform). The optimization of the enormous heat exchangers that are required for an OTEC plant is therefore of great importance and can have a major impact on the economic viability of OTEC technology.

Many types of heat exchangers have been employed in OTEC systems including; plate-fin, plate-frame, and shell-and-tube heat exchangers. Shell-and-tube heat exchangers are particularly attractive for use in OTEC applications because of their potential for large volume fluid flow and low back pressure. A shell-and-tube heat exchanger comprises multiple tubes placed between two tube sheets and encapsulated in a pressure-vessel shell. A first fluid or gas is passed through the tubes and a second fluid or gas is passed through the pressure-vessel shell such that it flows along the outer surface of the tubes. Heat energy is transferred between the first fluid and second fluid through the walls of the tubes. The tube ends are typically press fit or welded into the tube sheets.

Unfortunately, shell-and-tube heat exchangers have several drawbacks that have thus-far limited their use in marine applications. First, the overall heat transfer coefficient, U, that is associated with reasonable pressure drops for OTEC is typically below 2000 W/m$^2$K. Heat transfer efficiency is limited by, among other things (1) baffles that are typically included in the pressure-vessel to induce turbulence and transverse flow of the second fluid, and (2) a limitation on the flow rate of the second fluid to avoid inducing vibration and flow forces that induce mechanical stresses and strains on the tubes.

A second drawback of conventional shell-and-tube heat exchangers is that they are prone to "bio-fouling." Bio-fouling decreases efficiency and leads to increased maintenance costs (particularly for heat exchangers located at deep-water levels). Bio-fouling arises from, among other things, trapping of organic matter in voids and crevices, such as those associated with tubes that are press fit or fusion-welded into tube sheets.

A third drawback of conventional shell-and-tube heat exchangers is that they are not well-suited to seawater applications, such as OTEC. Since the tubes are press fit or fusion-welded into the tube sheets, it is difficult to ensure fluidic isolation between the primary fluid inside the tubes and seawater flowing around the tubes through the shell. Further, the reliability of conventional shell-and-tube heat exchangers is compromised by galvanic corrosion that occurs at the welded joints used to seal the tubes to the tube sheets. Galvanic corrosion occurs due to reactivity between dissimilar metals included in fusion welds. Galvanic corrosion is exacerbated by exposure of the welds to seawater. Reliability is degraded further by the potential for crevice corrosion in regions of stagnant flow even for shell-and-tube designs customized for OTEC applications.

Historically, these drawbacks have driven the size and cost for shell-and-tube heat exchangers too high for practical consideration.

With today's growing need for energy, using a renewable, constant, baseload power source is a desirable solution. As a consequence, there is a renewed interest in OTEC power plants. But development of a low-cost OTEC heat exchanger having high heat-exchange capacity, high flow rates, low pumping parasitic losses, and long life in the ocean environment remains elusive.

SUMMARY OF THE INVENTION

The present invention provides a heat exchanger without some of the costs and disadvantages of the prior art. Embodiments of the present invention are particularly well-suited for use in OTEC systems; however, embodiments in accordance with the present invention are also suited for use in other heat exchanger applications, such as nuclear reactors, chemical plants, and the like.

The illustrative embodiment of the present invention is a shell-and-tube heat exchanger wherein the tubes are arranged as a plurality of tube bundles, each of which includes a plurality of tubes for conveying a primary or secondary fluid. Each tube bundle is characterized by a central axis that extends from a first tube sheet to a second tube sheet, and each tube bundle is helically wound about its central axis.

In some embodiments, the tube sheets and the tubes are made of the same material and friction-stir welding is used to join the tube walls to the tube sheets. As a result, the tube walls and tube sheets form substantially galvanic corrosion-resistant joints that seal and isolate the fluid in the tubes from a fluid that flows around the tubes in the shell.

In some embodiments, the plurality of tube bundles is arranged at each tube sheet in a hexagonally close-packed arrangement.

In some embodiments, the tubes within each tube bundle are mechanically coupled to restrict the motion of each tube relative to the other tubes within its tube bundle. In some embodiments, the tubes within each tube bundle are mechanically coupled to substantially disallow any motion of each tube relative to the other tubes within each tube bundle.

In some embodiments, a first tube bundle is enclosed in a first shroud that conveys a first fluid and a second tube bundle is enclosed in a second shroud that conveys a second fluid that is different from the first fluid as well as the fluid flowing through the tubes themselves.

An embodiment of the present invention comprises: a heat exchanger comprising a first tube bundle having a first central axis, wherein the first tube bundle comprises a first plurality of tubes for conveying a first fluid, and wherein the first tube bundle is helically wound about the first central axis.

BRIEF DESCRIPTION OF THE DRAWINGS

FIG. 6 depicts an arrangement of tube bundles in accordance with a first alternative embodiment of the present invention.

FIG. 7A depicts a tube bundle in accordance with a second alternative embodiment of the present invention.

FIG. 7B depicts tube bundle 700 prior to the winding of outer tubes 704 about center tube 702.

FIG. 7C depicts bundle assembly mechanism for forming a tube bundle in accordance with the second alternative embodiment of the present invention.

FIG. 8 depicts a guide for holding outer tubes 704 and center tube 702 during and/or after formation of tube bundle 700.

DETAILED DESCRIPTION

Figure 1:
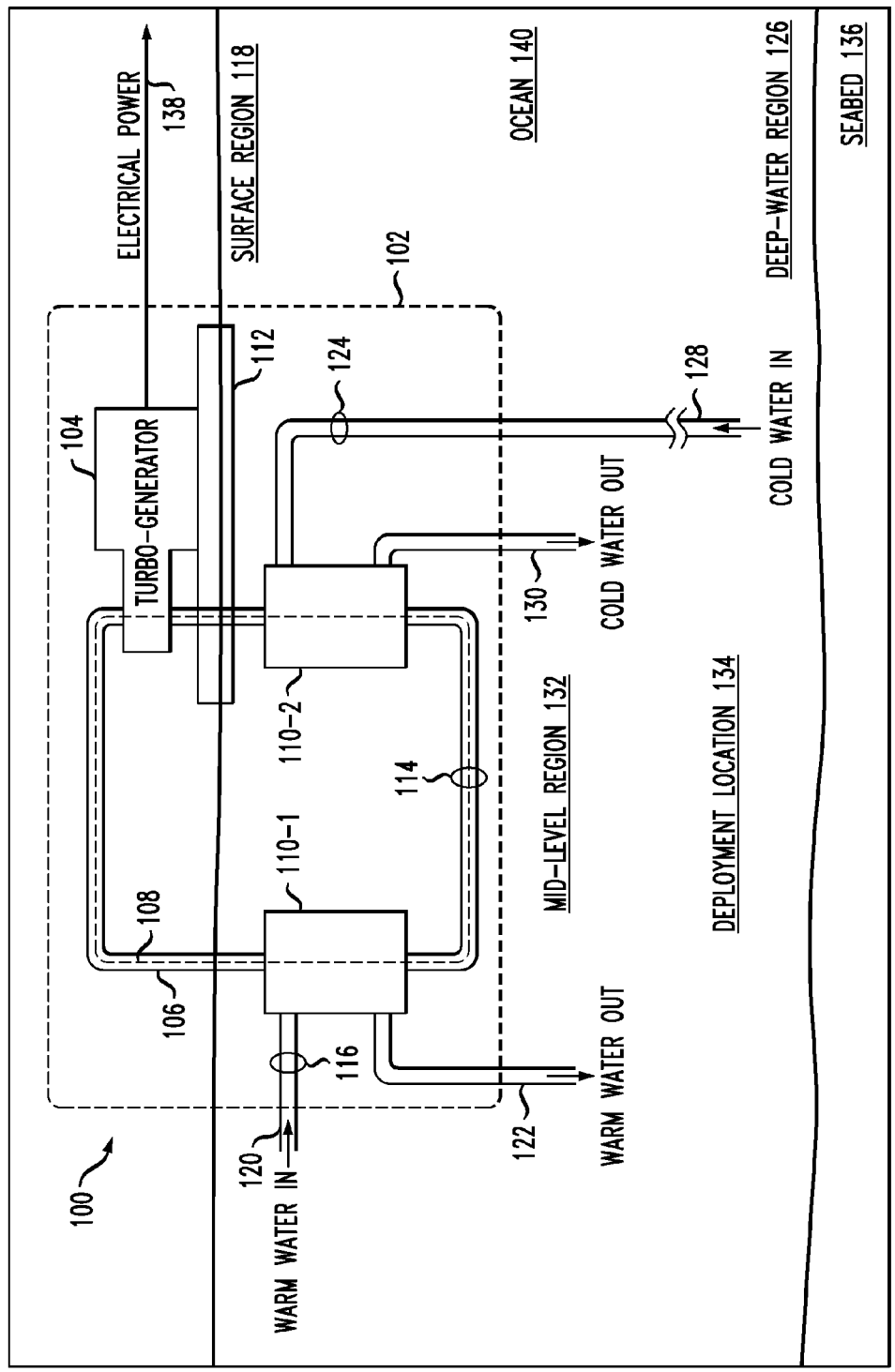
FIG. 1 depicts a schematic diagram of an OTEC power generation system in accordance with an illustrative embodiment of the present invention.

FIG. 1 depicts a schematic diagram of an OTEC power generation system in accordance with an illustrative embodiment of the present invention. OTEC system 100 comprises offshore platform 102, turbogenerator 104, closed-loop conduit 106, evaporator 110-1, condenser 110-2, hull 112, pumps 114, 116, and 124, and conduits 120, 122, 128, and 130.

Offshore platform 102 is a tension leg offshore platform comprising buoyant hull 112, which includes a deck, caissons, and pontoons. The hull is supported above seabed 136 by rigid tension legs that are anchored to seabed 136 at deployment location 134. For clarity, the deck, caisson, pontoons, and tension legs are not shown in FIG. 1.

In some embodiments, offshore platform 102 is deployed at a deployment location in a body of water other than an ocean (e.g., a lake, sea, etc.). In some embodiments, offshore platform 102 is an offshore platform other than a tension leg offshore platform, such as a semi-submersible, spar, drill ship, jack-up offshore platform, grazing plant, and the like. It will be clear to one skilled in the art how to specify, make, and use platform 102.

Turbogenerator 104 is a conventional turbine-driven generator mounted on hull 112. Turbogenerator 104 generates electrical energy in response to a flow of fluid and provides the generated electrical energy on output cable 138.

Closed-loop conduit 106 is a conduit for conveying working fluid 108 through evaporator 110-1, condenser 110-2, and turbogenerator 104.

Evaporator 110-1 is a shell-and-tube heat exchanger that is configured to transfer heat from warm seawater in surface region 118 and working fluid 108 thereby inducing the working fluid to vaporize.

Condenser 110-2 is a shell-and-tube heat exchanger that is configured to transfer heat from vaporized working fluid 108 to cold seawater from deep-water region 126 thereby inducing condensation of vaporized working fluid 108 back into liquid form. Evaporator 110-1 and condenser 110-2 are mechanically and fluidically coupled with offshore platform 102.

One skilled in the art will recognize that the operation of a heat exchanger as evaporator or condenser is dependent upon the manner in which it is fluidically configured within OTEC system 100. A shell-and-tube heat exchanger (i.e., heat exchanger 110) in accordance with the illustrative embodiment of the present invention is described in more detail below and with respect to FIG. 4.

Turbogenerator 104, closed-loop conduit 106, evaporator 110, and condenser 112 collectively form a Rankine-cycle engine that generates electrical energy based on the difference in the temperature of water in surface region 118 and the temperature of water in deep-water region 126.

In typical operation, pump 114 pumps working fluid 108, in liquid form, through closed-loop conduit 106 to evaporator 110-1. Ammonia is often used as working fluid 108 in OTEC systems; however, it will be clear to one skilled in the art that any fluid that evaporates at the temperature of the water in surface region 118 and condenses at the temperature of the water in deep water region 126 is suitable for use as working fluid 108 (subject to material compatibility constraints).

Pump 116 draws warm seawater from surface region 118 into evaporator 110 via conduit 120. In a typical OTEC deployment, the water in surface region 118 is at a substantially constant temperature of approximately 25 degrees centigrade (subject to weather and sunlight conditions). At evaporator 110-1, heat from the warm water is absorbed by working fluid 108, which induces the working fluid to vaporize. After passing through evaporator 110-1, the now slightly cooler water is ejected back into ocean 140 via conduit 122. The output of conduit 122 is typically located deeper in ocean 140 than surface region 118 (i.e., mid-level region 132) to avoid decreasing the average water temperature in the surface-water region.

The expanding working fluid 108 vapor is forced through turbogenerator 104, thereby driving the turbogenerator to generate electrical energy. The generated electrical energy is provided on output cable 138. After passing through turbogenerator 104, the vaporized working fluid enters condenser 110-2.

Pump 124 draws cold seawater from deep-water region 126 into condenser 110-2 via conduit 128. Typically deep-water region 126 is approximately 1000 meters below the surface of the body of water, at which depth water is at a substantially constant temperature of a few degrees centigrade. The cold water travels through condenser 110-2 where it absorbs heat from the vaporized working fluid. As a result, working fluid 108 condenses back into liquid form. After passing through condenser 110-2, the now slightly warmer water is ejected into ocean 140 via conduit 130. The output of conduit 130 is typically located at a shallower depth in ocean 140 than that of deep-water region 126 (i.e., mid-level region 132) to avoid increasing the average water temperature in the deep-water region.

Pump 114 pumps the condensed working fluid 108 back into evaporator 110-1 where it is again vaporized, thereby continuing the Rankine cycle that drives turbogenerator 104.

Figure 2:
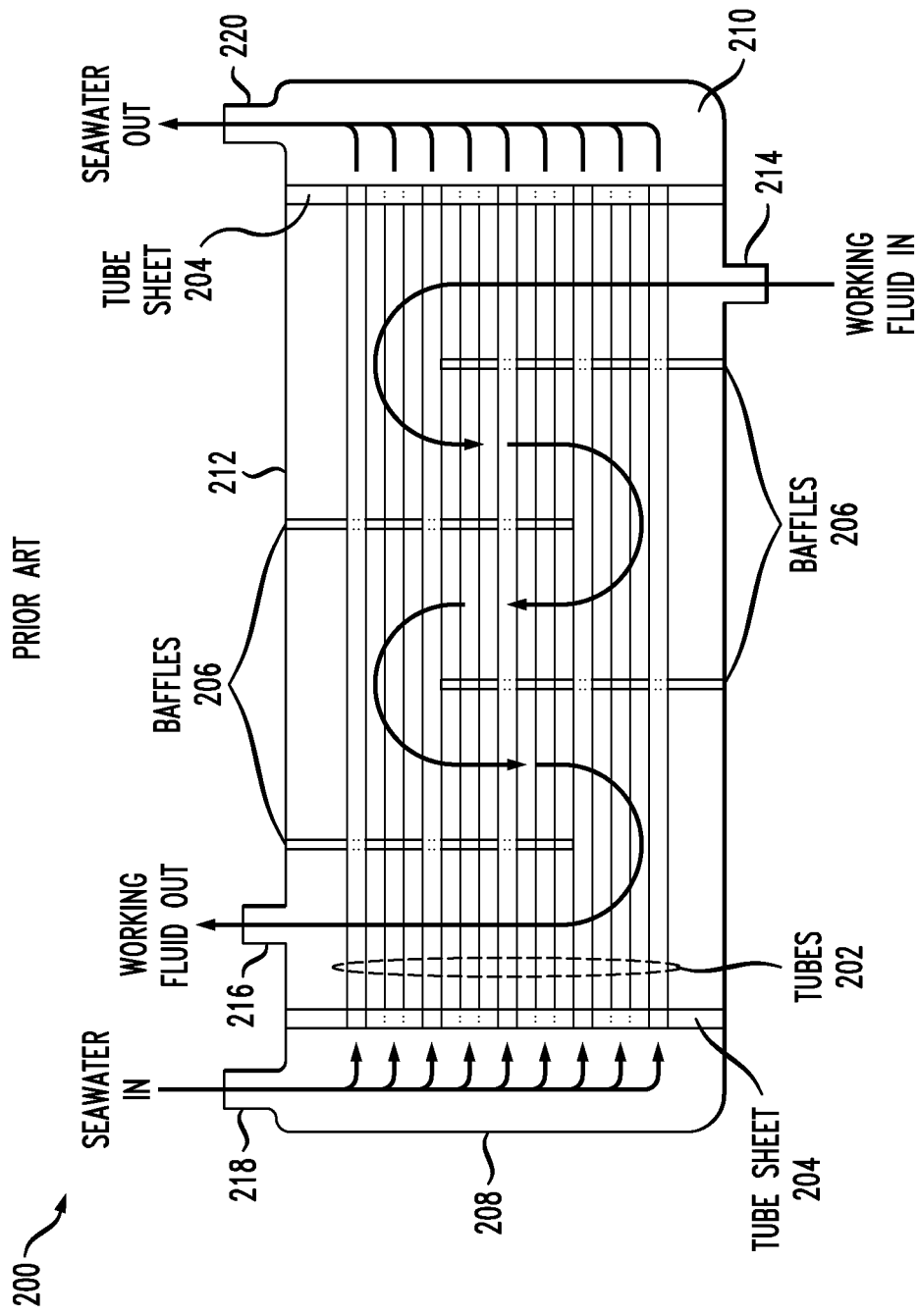
FIG. 2 depicts a conventional shell-and-tube heat exchanger as is known in the prior art.

FIG. 2 depicts a conventional shell-and-tube heat exchanger as is known in the prior art. Heat exchanger 200 comprises tubes 202, tube sheets 204, baffles 206, input plenum 208, output plenum 210, shell 212, secondary inlet 214, and secondary outlet 216. Heat exchanger 200 transfers heat between a primary fluid and a secondary fluid. For a heat exchanger intended for use in OTEC applications, the primary fluid is typically a working fluid, such as ammonia, and the secondary fluid is typically seawater.

Tubes 202 are straight, untwisted conduits made of a thermally conductive material, such as copper alloy, stainless steel, carbon steel, non-ferrous copper alloy, Inconel, nickel, Hastelloy and titanium. Working fluid is provided to heat exchanger 200 at input 218. Input 218 is fluidically connected to input plenum 208, which distributes the working fluid to each of tubes 202. Tubes 202 convey the working fluid to output plenum 210, which collects the working fluid and provides it to output 220. Input 218 and output 220 are typically connected to a closed-loop conduit that conveys the working fluid.

Tube sheets 204 are substantially identical plates, each comprising an array of holes that accept one of tubes 202. Tubes 202 are affixed to tube sheets 204 by, for example, flaring the ends of the tubes to mechanically "swage" the tubes within the holes. Alternatively, brazing, bonding or welding is used to join the tubes and the tube sheets.

The holes in tube sheet 204 are arranged in a two-dimensional arrangement that sets the separation between tubes 202 to provide for a large number of tubes in the shell-and-tube heat exchanger. Since heat transfer primarily occurs in the heat exchanger through the sidewalls of the tubes, it is desirable to include as many tubes in a heat exchanger as possible to substantially maximize the surface area through which heat can be transferred between the primary and secondary fluids. The spacing between tubes 202 must also be sufficient to enable a reasonable flow rate of secondary fluid around and along tubes 202, without reducing the efficiency of the heat exchanger due to the development of fluidic back pressure.

Baffles 206 are distributed along the length of tubes 202 to increase the interaction time and length between the secondary fluid and the walls of tubes 202. Baffles 206, however, also restrict the flow of secondary fluid through heat exchanger 200; thereby increasing back pressure for the secondary fluid, increasing the force with which the secondary fluid must be pumped, and reducing the overall heat transfer efficiency of the heat exchanger.

Primary (a.k.a., working) fluid is introduced to tubes 202 through input plenum 208. Input plenum 208 is typically brazed or welded to tube sheet 204. In similar fashion, primary fluid exits tubes 202 via output plenum 210, which is typically brazed or welded to its respective tube sheet 204.

Shell 212 encloses tubes 202 and forms a conduit for secondary fluid. Shell 212 is typically bolted to tube sheets 204. Normally, a gasket is included between the shell and tube sheet to provide a fluidic seal.

Secondary fluid is introduced into shell 212 through secondary inlet 214 and exits heat exchanger 200 through secondary outlet 216. Secondary inlet 214 and secondary outlet 216 are typically brazed or welded to shell 212.

Unfortunately, conventional shell-and-tube heat exchangers have several issues, particularly with respect to their use in an OTEC system. Tube material must be chosen to have good thermal conductivity, but also to withstand large thermal stresses that develop due to the temperature differential between the primary and secondary working fluids. In addition, the primary and secondary fluids are often at high pressure, which adds to the bending moments to which tubes 202 are subject. Further, the tube material must also be compatible with both the shell-and-tube side fluids for long periods under the operating conditions (e.g., temperatures, pressures, flows, pH, etc.) to mitigate the effects of corrosion. Still further, the choice of tube material and/or joining material (e.g., brazing compounds or welding material, etc.) could result in a leak through a tube between the shell-and-tube sides causing fluid cross-contamination and possibly loss of pressure and failure of the heat exchanger.

Figure 3A:
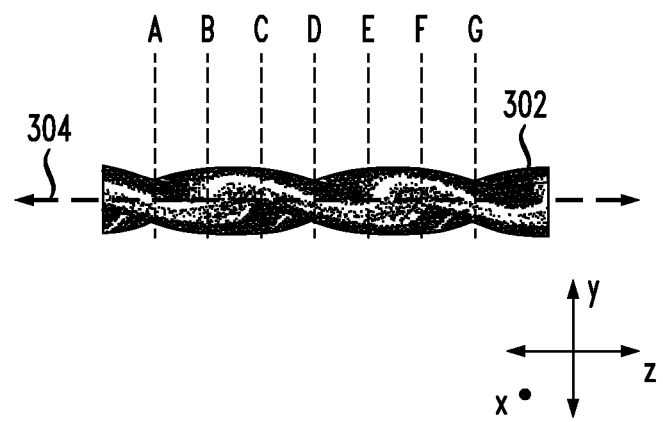
FIG. 3A depicts a twisted tube suitable for use in a shell-and-tube heat exchanger in accordance with the prior art.

FIG. 3A depicts a twisted tube suitable for use in a shell-and-tube heat exchanger in accordance with the prior art. Tube 302 is a straight, oval-shaped conduit suitable for use as a tube 202 in heat exchanger 200. In contrast to tube 202, however, tube 302 is individually twisted about its longitudinal axis 304. It should be noted that while the ovular cross-section of tube 302 rotates about longitudinal axis 304, longitudinal axis 304 remains substantially straight along the length of tube 302.

Figure 3B:
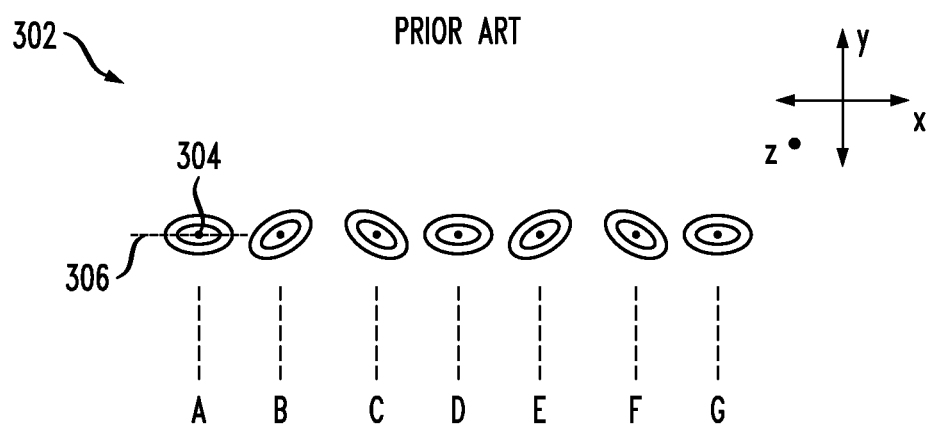
FIG. 3B depicts a series of cross-section views of tube 302 at different points along the z-direction.

FIG. 3B depicts a series of cross-section views of tube 302 at different points along the z-direction.

At point A along the z-direction, major-axis 306 of the ovular cross-section of tube 302 is aligned with the x-direction. At point B, major-axis 306 has rotated to approximately 60° in the x-y plane. At point C, major-axis 306 has rotated another 60 degrees to approximately 120° in the x-y plane. Point D is at approximately one-half the wavelength of the rotational period of tube 302, and major-axis 306 is again aligned with the x-direction. Additional rotation of tube 302 of approximately 60° about longitudinal axis 304 occurs between each of points E, F, and G. As a result, major-axis 306 is again at approximately 60° and 120°, respectively, in the x-y plane. Point G represents one full wavelength of the rotational period of tube 302; therefore, major-axis 306 is again aligned with the x-direction.

The twisted structure of tube 302 results in an increase of the surface area of its tube walls. As a result, heat transfer between primary and secondary fluid through the tube walls of tube 302 can be more efficient than that of tube 202. In addition, the mechanical resonant frequency of a twisted tube is higher than a comparable untwisted tube, which makes tubes 302 more resistant than tubes 202 to lateral deflection due to forces exerted by secondary fluid flow through a heat exchanger.

Tube 302 has several drawbacks, however. Individually twisted tubes are harder to clean and are more prone to bio-fouling than untwisted tubes. Individually twisted tubes also require tight packing to retain an interlocking/high section modulus. This need for tight packing places undesirable constraints on the arrangement of the tubes within a shell-and-tube heat exchanger.

Figure 4:
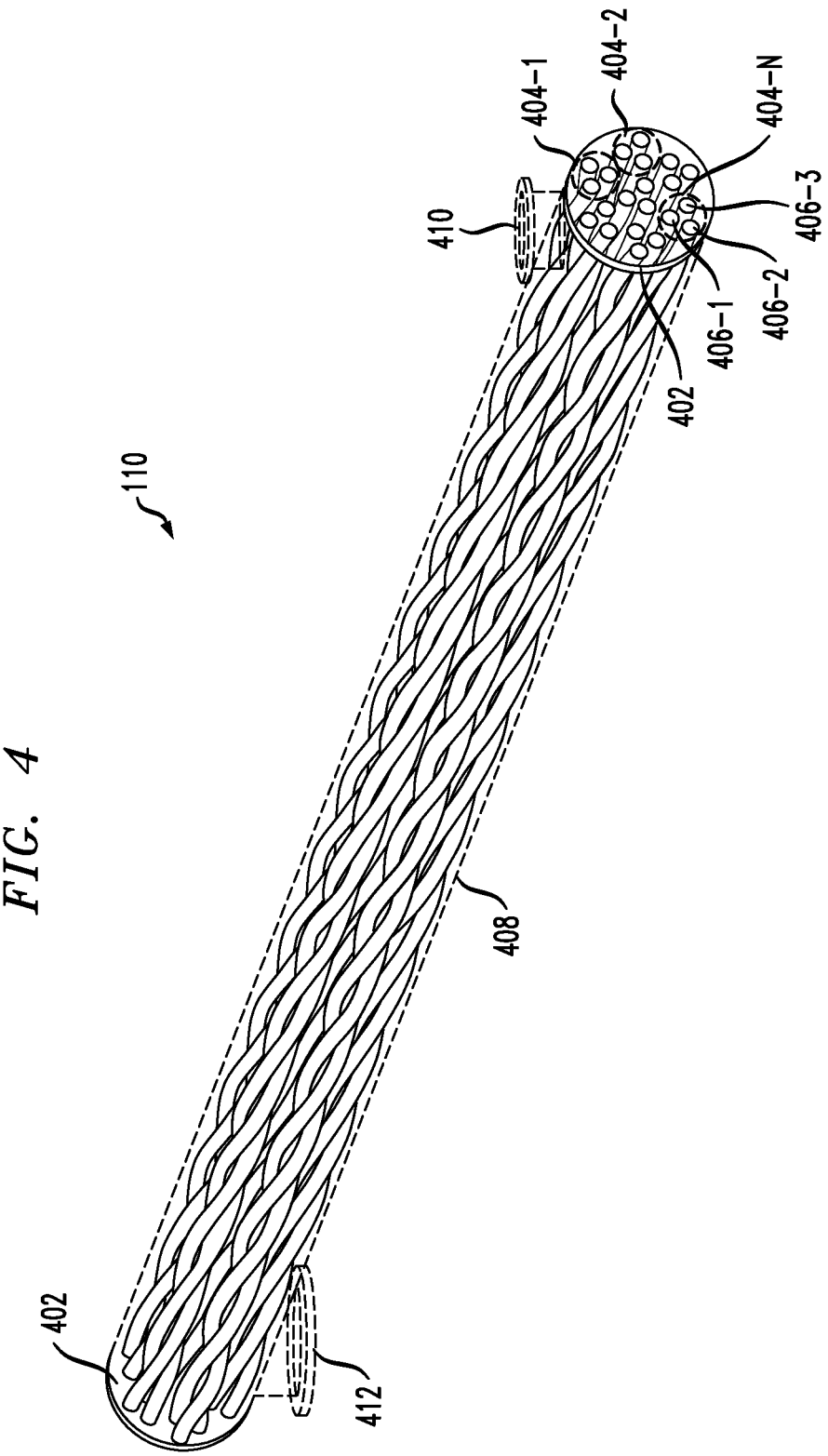
FIG. 4 depicts a shell-and-tube heat exchanger in accordance with an illustrative embodiment of the present invention.

FIG. 4 depicts a shell-and-tube heat exchanger in accordance with an illustrative embodiment of the present invention. Heat exchanger 110 comprises tube sheets 402, tube bundles 404-1 through 404-N, shell 408, inlet 410, and outlet 412.

Tube sheets 402 are analogous to tube sheets 204 and 206 of heat exchanger 100; however, the hole arrangement of tube sheets 402 accommodates tube bundles 404-1 through 404-N (referred to, collectively, as tube bundles 404).

Tube sheets 402 are made of marine-grade aluminum alloy. Certain alloys of aluminum are well-suited to OTEC applications by virtue of their resistance to corrosion in sea water. Further, aluminum and most of its alloys are amenable to the use of the friction-stir welding (FSW) joining technique.

Friction-stir welding is a well-known method for joining two elements of the same material. Conventional FSW employs a rotating probe that is forced into the interface between the two elements. The immense friction between the probe and materials causes material in the immediate vicinity of the probe to heat up to temperatures below its melting point. This softens the adjoining sections, but because the material remains in a solid state, its original material properties are retained. Movement of the probe along the weld line forces the softened material from the two pieces towards the trailing edge causing the adjacent regions to fuse, thereby forming a weld.

As opposed to other common joining techniques, such as fusion welding, brazing, etc., FSW has several performance advantages. In particular, the resultant weld is comprised of the same material as the joined sections. As a result, galvanic corrosion due to contact between dissimilar metals at the joint is reduced or eliminated. Furthermore, the resultant weld retains the material properties of the material of the joined sections.

The use of FSW to join the components of heat exchanger 110 affords the present invention several advantages, as described below.

Each of tube bundles 404 comprises tubes 406-1 through 406-3 (referred to, collectively, as tubes 406). Tubes 406 are extruded tubes made of the same material as tube sheets 402. In some embodiments, tubes 406 are drawn tubes. In some embodiments, tubes 406 are formed such that they are substantially seamless. Tubes 406 convey seawater through the length of heat exchanger 110. Although in the illustrative embodiment, each of tube bundles 404 comprises three tubes, it will be clear to one skilled in the art, after reading this specification, how to make and use alternative embodiments of the present invention wherein at least one tube bundle comprises more or less than three tubes.

Although the illustrative embodiment comprises tubes and tube sheets that are made of aluminum, it will be clear to one skilled in the art, after reading this specification, how to specify, make, and use alternative embodiments of the present invention that comprise components that are made of another material that is substantially resistant to corrosion, particularly in an ocean environment. The material used for tube sheets 402 and tubes 406 should not exhibit excessive corrosion in an ocean environment over the lifetime of the heat exchanger. In addition, the material used for tube sheets 402 and tubes 406 should be substantially thermally conductive. Materials suitable for use in tube sheets 402 and tubes 406 include, without limitation, aluminum, aluminum alloys, ceramics, steel alloys, titanium, titanium alloys, thermally conductive plastics, thermally conductive polymers, and the like.

In some embodiments, a joining technique other than FSW is used to join components together with a substantially galvanic corrosion-resistant joint. In some embodiments, suitable joining techniques include, without limitation, some types of fusion welding, the use of elastomeric, thermoplastic, thermoset or epoxy-based joint compounds, and the like.

The size, length, and wall thickness of each of tubes 406 are design parameters that are dependent on the particular implementation of the present invention. For exemplary purposes, however, in the illustrative embodiment, each of tubes 406 is approximately 24 millimeter (mm) in diameter, is approximately 10 meters long, and has a wall thickness of approximately 2.54 mm.

Tube bundles 404 are described in more detail below and with respect to FIGS. 5A and 5B.

Tube bundles 404 are arranged at tube sheets 402 in a hexagonal close-packed arrangement. In some embodiments, tube bundles 404 are arranged at tube sheets 402 in a packing arrangement other than a hexagonal close-packed arrangement.

Shell 408 is a shell suitable for enclosing tube bundles 404 and also for conveying primary (i.e., working) fluid along the surfaces of tubes 406. Shell 408 is made of a material that is suitably resistant to corrosion or other damage as a result of exposure to the working fluid.

Working fluid enters shell 408 through inlet 410 and exits shell 408 through outlet 412. As a result, working fluid is conveyed along and between tubes 406 enabling efficient heat transfer between the seawater within tubes 406 and the working fluid. It will be clear to one skilled in the art how to specify, make, and use inlet 410 and outlet 412.

It should be noted that in the illustrative embodiment, heat exchanger 110 operates in a manner opposite to heat exchanger 200 in that secondary fluid (i.e., seawater) is conveyed through each of the tubes in tube bundles 404 and working fluid is conveyed around and along the tubes during its progress through shell 408. One skilled in the art will recognize, however, after reading this specification, that heat exchanger 110 can operate in a similar manner as heat exchanger 200, wherein working fluid flows through tubes 408 and secondary fluid (e.g., seawater) flows through shell 408.

Figure 5A:
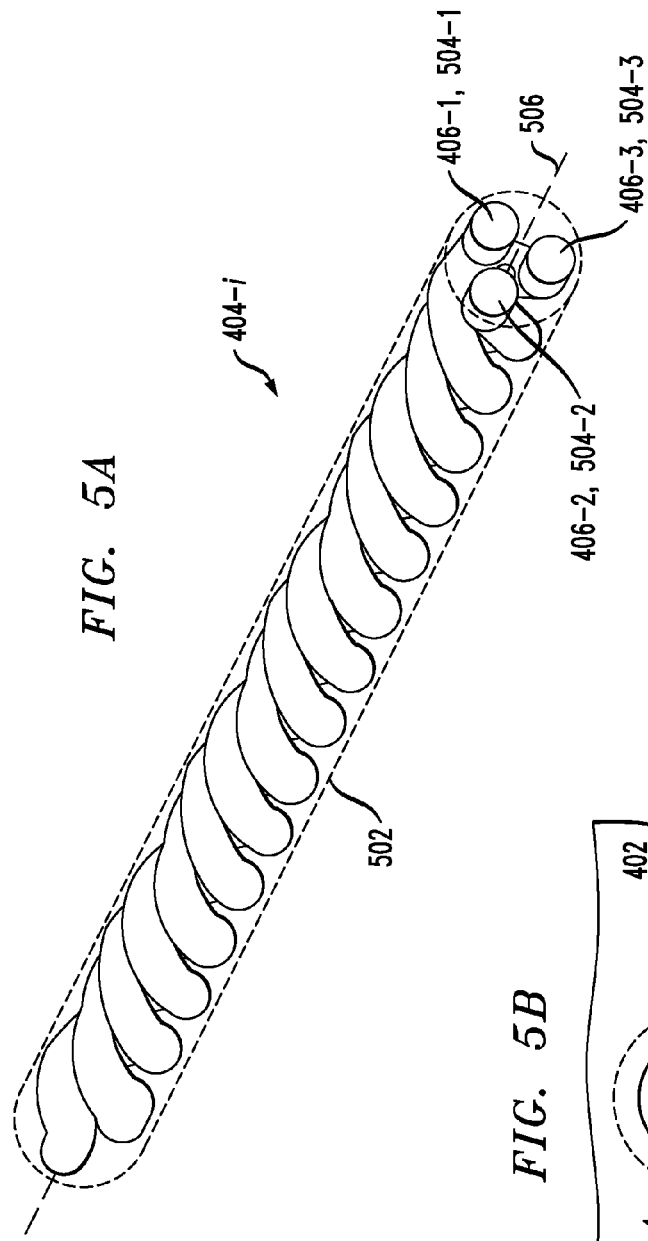
FIG. 5A depicts a tube bundle in accordance with the illustrative embodiment of the present invention.

FIG. 5A depicts a tube bundle in accordance with the illustrative embodiment of the present invention. Tube bundle 404-*i* comprises tubes 406-1, 406-2, and 406-3 and optional bundle shroud 502.

Ends 504-1 through 504-3 of tubes 406-1 through 406-3 are arranged at tube sheet 402 (not shown) in a symmetrical arrangement about central axis 506. Tube bundle 404-*i* is twisted, as a unit, about central axis 506 to form a helically wound arrangement. The outer radius of the helically wound bundle, periodicity of the helical wound spiral, and the outer radius of the bundle, are matters of design.

In some embodiments, tubes 406-1 through 406-3 are rigidly attached to one another. Motion of an individual tube with respect to the tube bundle, therefore is disallowed. In some embodiments, tubes 406-1 through 406-3 are partially attached to one another, such as only at those points where the tubes within a tube bundle meet as a consequence of their helically wound configuration. Motion of an individual tube with respect to the tube bundle, therefore, is restricted. As a result, tube bundles in accordance with the present invention are characterized by higher mechanical stiffness.

Heat exchangers in accordance with the present invention have several advantages over heat exchangers of the prior-art that comprise straight, untwisted tubes, such as:
  i. improved heat transfer efficiency due to larger tube wall surface area; or
  ii. increased tube stiffness; or
  iii. increased resistance to flow-induced vibration of the tubes; or
  iv. improved flow of secondary fluid; or
  v. high section modulus; or
  vi. any combination of i, ii, iii, iv, and v.

Heat exchangers in accordance with the present invention have several advantages over heat exchangers of the prior-art that comprise individual twisted tubes, such as:
  i. reduced susceptibility to bio-fouling; or
  ii. improved immunity to corrosion; or
  iii. improved surface area per tube; or
  iv. improved secondary fluid flow; or
  v. any combination of i, ii, iii, and iv.

It should be noted that the helical arrangement of tubes enhances heat flow between the primary and secondary fluids by breaking up boundary layers inside and/or outside the tubes and combining axial and radial flow of fluid along and around the outer surface of the tubes. The swirling flow of the fluid through the tubes enhances heat transfer across the fluid boundary layer with relatively little increase in pressure drop through the heat exchanger. As a result, in some embodiments, baffles to redirect fluid flow through shell 502, such as baffles 206 described above and with respect to FIG. 2, are not required.

Figure 5B:
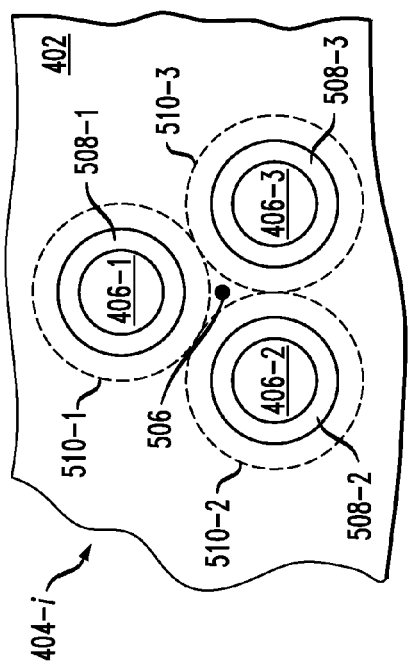
FIG. 5B depicts an end-view of tube bundle 404-$i$ in accordance with the illustrative embodiment of the present invention.

FIG. 5B depicts an end-view of tube bundle 404-$i$ in accordance with the illustrative embodiment of the present invention.

Tube 406-1 comprises sidewall 508-1. Sidewall 508-1 is joined with tube sheet 402 using FSW to form a substantially leak-proof seal around the outer perimeter of tube 406-1. FSW is a method of joining two elements without incorporating a dissimilar material. FSW-welded joints substantially retain the bulk material properties of the material joined and the metal grain boundaries of the materials joined are normally not adversely affected. FSW is described in detail in U.S. patent application Ser. No. 12/484,542, filed Jun. 15, 2009, which is incorporated herein by reference. FSW is an example of a joining technology that results in a substantially galvanic corrosion-resistant joint.

The joint formed between sidewall 508-1 and tube sheet 402 avoids the formation of crevices that typically exist between mechanically rolled tube ends and the surrounding tube sheet material in a conventional shell-and-tube heat exchanger. By avoiding these crevices, the lifetime of a heat exchanger in accordance with the present invention can be significantly longer since corrosion due to exposure to corrosive seawater in the crevices is mitigated or eliminated.

In similar fashion, tube 406-2 comprises sidewall 508-2. Sidewall 508-2 is joined with tube sheet 402 by means of friction-stir welding (FSW) to form a substantially leak-proof seal around the perimeter of tube 406-2. Further, tube 406-3 comprises sidewall 508-3. Sidewall 508-3 is joined with tube sheet 402 by means of friction-stir welding (FSW) to form a substantially leak-proof seal around the perimeter of tube 406-3.

One skilled in the art will recognize, however, that the FSW process leaves heat-affected zone 510-1, which surrounds the bond between sidewall 508-1 and tube sheet 402. The lateral extent of this heat-affected zone limits the minimum spacing between tube sidewalls 508-1 through 508-3 at each of tube sheets 402.

The helical tube bundles act as spring elements that can readily handle a pre-load or axial loading resulting from pressure differences between tube and shell side, or temperature expansion/contraction variations between materials. In some embodiments, the tubes within one or more of tube bundles 404 are pre-loaded to increase their resonant frequency and, therefore, their resistance to flow-induced vibration during operation.

In addition, the increased stiffness of helically arranged tubes makes heat exchangers in accordance with the present invention amenable to vertical operation, such as in an upward-flowing shell-side evaporator or a downward flowing shell-side condenser.

It should be noted that tube bundles 404 can be formed in any of several ways. In some embodiments, one or more of tube bundles 404 is formed by winding pre-formed tubes about central axis 506, in similar fashion to the method described below and with respect to FIGS. 7A-C and 8. Alternatively, one or more of tube bundles 404 can be formed in its helically wound arrangement by extruding all of the tubes 502 in the plurality of tubes 406 at the same time, while simultaneously rotating an extrusion die or the extruded material during the extrusion process.

FIG. 6 depicts an arrangement of tube bundles in accordance with a first alternative embodiment of the present invention.

Heat exchanger 600 comprises a hexagonally close-packed arrangement of tube bundles 404. Each tube bundle is enclosed within bundle shroud 602. Each bundle shroud is fluidically isolated from the other bundle shrouds, which enables heat exchanger 600 to carry different fluids through different bundle shrouds. Further, in some embodiments, one or more tubes within tube bundles 404 convey a different fluid from at least one other tube within the tube bundles.

For example, each tube within tube bundle 404-1 carries a first secondary fluid while each tube within each of tube bundles 404-2 through 404-N carries a second secondary fluid. Further, bundle shroud 602-2 conveys a first primary fluid while each of bundle shrouds 602-1 and 602-3 through 602-N conveys a second primary fluid.

One skilled in the art will recognize, after reading this specification, that the arrangement depicted in FIG. 6 can be larger heat exchangers FIG. 7A depicts a tube bundle in accordance with a second alternative embodiment of the present invention. Tube bundle 700 comprises center tube 702 and outer tubes 704.

Each of tubes 702 and 704 is analogous to one of tubes 406 described above and with respect to FIG. 3.

Tube bundle 700 is analogous to one of tube bundles 404, with the exception that center tube 702 is straight and untwisted and outer tubes 704 are wound about center tube 702. Center tube 702 is co-linear with central axis 706 of tube bundle 700.

Although tube bundle 700 comprises six outer tubes 704, it will be clear to one skilled in the art, after reading this specification, how to specify, make, and use alternative embodiments of the present invention wherein tube bundle 700 comprises other than six outer tubes 704 and/or more than one center tube 702.

FIG. 7B depicts tube bundle 700 prior to the winding of outer tubes 704 about center tube 702.

FIG. 7C depicts bundle assembly mechanism for forming a tube bundle in accordance with the second alternative embodiment of the present invention. Mechanism 708 comprises support structure 710, fixed end cap 712, and rotatable end cap 714.

In a representative method for forming tube bundle 700, center tube 702 and outer tubes 704 are inserted into fixed end cap 712 and rotatable end cap 714. Rotating end cap 714 is then rotated to wind outer tubes 704 about central axis 706 until the desired amount of winding and periodicity of the helical arrangement of outer tubes 704 is achieved. Tube bundle 700 is then removed from each of fixed end cap 712 and rotatable end cap 714.

FIG. 8 depicts a guide for holding outer tubes 704 and center tube 702 during and/or after formation of tube bundle 700. Guide 800 keeps outer tubes 704 bundled together by means of arms 802. Aperture 804 enables guides 800 to rotate about center tube 702 without inducing torsional strain on the center tube. In some embodiments, a plurality of guides is arranged along the length of tube bundle 700.

It is to be understood that the disclosure teaches just one example of the illustrative embodiment and that many variations of the invention can easily be devised by those skilled in the art after reading this disclosure and that the scope of the present invention is to be determined by the following claims.

What is claimed is:

1. A heat exchanger for underwater operation comprising:
   a plurality of tube bundles each being a same first length that extends from a first end of the plurality of tube bundles to a second end of the plurality of tube bundles, each tube bundle comprising a plurality of tubes helically wound about a central axis, each tube configured to carry a fluid from a first tube end to a second tube end;
   a plurality of tube shrouds being the same first length, each tube shroud circumferentially enclosing a respective one of the tube bundles and forming a passage about the respective one of the tube bundles that is fluidically isolated from the tubes of the respective one of the tube bundles;
   a first tube sheet fixed with respect to first ends of the plurality of tube shrouds and having a plurality of first openings configured to facilitate a flow of separate fluids through the plurality of tube shrouds and the plurality of tube bundles;
   a second tube sheet fixed with respect to second ends of the plurality of tube shrouds and having a plurality of second openings configured to facilitate the flow of the separate fluids through the plurality of tube shrouds and the plurality of tube bundles; and
   a shell coupled to the first tube sheet and to the second tube sheet and defining a chamber in which the plurality of tube shrouds is disposed.

2. The heat exchanger of claim 1 wherein the first tube sheet is fixed with respect to the first ends of the plurality of tube shrouds via a friction-stir welded joint.

3. The heat exchanger of claim 2 wherein the second tube sheet is fixed with respect to the second ends of the plurality of tube shrouds via a friction-stir welded joint.

4. The heat exchanger of claim 1 wherein the plurality of tube bundles, the plurality of tube shrouds, the first tube sheet, and the second tube sheet comprise a same material.

5. The heat exchanger of claim 4 wherein the same material comprises aluminum.

6. The heat exchanger of claim 1 wherein the tubes of the plurality of tubes in each tube bundle are attached to each other.

7. The heat exchanger of claim 1 wherein the plurality of shrouds is not in contact with the shell or the plurality of tube bundles.

* * * * *